United States Patent [19]

Veitch et al.

[11] Patent Number: 5,490,476
[45] Date of Patent: Feb. 13, 1996

[54] TEMPERATURE INDICATOR FOR DEEP-FROZEN PRODUCTS

[75] Inventors: Ronald J. Veitch, Maxdorf; Helmut Jakusch, Frankenthal; Peter Heilmann, Bad Duerkheim, all of Germany

[73] Assignee: BASF Magnetics GmbH, Mannheim, Germany

[21] Appl. No.: 286,253

[22] Filed: Aug. 8, 1994

Related U.S. Application Data

[63] Continuation of Ser. No. 41,408, Mar. 31, 1993, abandoned.

[30] Foreign Application Priority Data

Apr. 1, 1992 [DE] Germany .................. 42 10 739.3

[51] Int. Cl.$^6$ .................. G01K 1/02; G01K 11/06; G01K 1/14
[52] U.S. Cl. .................. 116/217; 374/163; 374/160; 374/106; 426/88
[58] Field of Search .................. 374/160, 163, 374/106; 426/88; 116/217

[56] References Cited

U.S. PATENT DOCUMENTS

| | | | |
|---|---|---|---|
| 483,365 | 9/1892 | Rapkin et al. | 374/102 |
| 2,660,719 | 11/1953 | Stromberg | 116/204 |
| 3,456,614 | 7/1969 | Hampton | 116/218 |
| 3,675,501 | 7/1972 | DeKanter | 374/160 |
| 3,915,340 | 10/1975 | Koeleman | 116/204 X |
| 4,850,716 | 7/1989 | Baker et al. | 374/160 |
| 4,993,843 | 2/1991 | Toupin et al. | 374/160 |

FOREIGN PATENT DOCUMENTS

| | | |
|---|---|---|
| 250217 | 12/1987 | European Pat. Off. . |
| 2640750 | 6/1990 | France . |
| 2547638 | 4/1977 | Germany . |
| 3243031 | 5/1984 | Germany . |
| 3908425 | 8/1990 | Germany . |

*Primary Examiner*—Diego F. F. Gutierrez
*Attorney, Agent, or Firm*—Keil & Weinkauf

[57] ABSTRACT

An apparatus for checking deep-frozen food, which irreversibly indicates if an additional storage temperature has been exceeded, is described. A flat plastic bag having transparent walls, into which eutectic mixture having a liquid/solid phase transition in the range from 0° to −50° C. has been introduced, together with a magnetic dispersion consisting of finely divided magnetic pigments, has a heat-conducting connection to the material to be frozen. A magnetic stripe which contains a magnetically recorded pattern and which remains connected to the bag until the indicating apparatus together with the material to be frozen has been cooled below the limiting temperature is stuck to the bag. The magnetic stripe is then removed. If the permissible limiting temperature is exceeded, the optically or magnetically readable structure produced by the magnetic stripe in the indicator bag is eliminated, permitting easy checking of the deep-frozen food. The present invention permits many potential variations by combination of a plurality of applied magnetic stripes.

6 Claims, 1 Drawing Sheet

U.S. Patent  Feb. 13, 1996  5,490,476
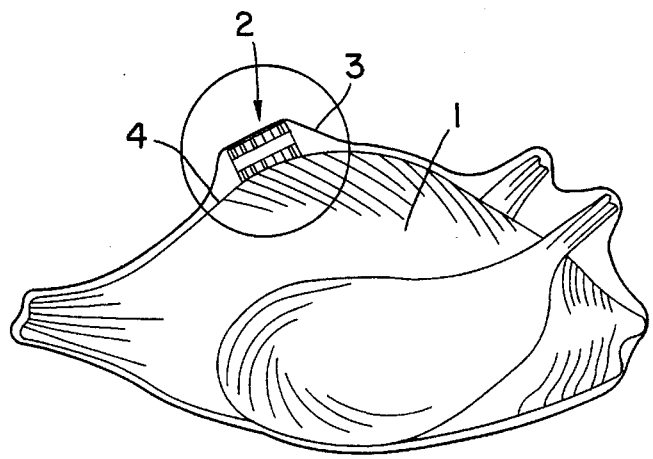
FIG. I
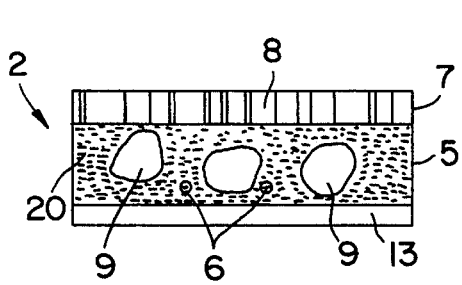
FIG. 2
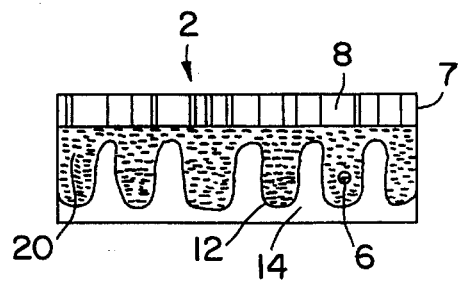
FIG. 3
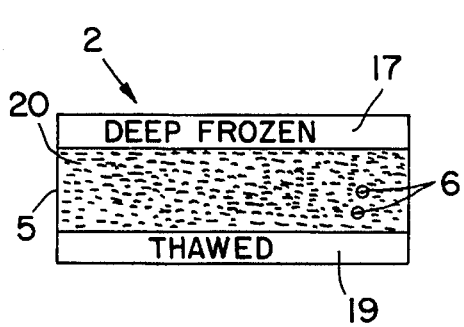
FIG. 4
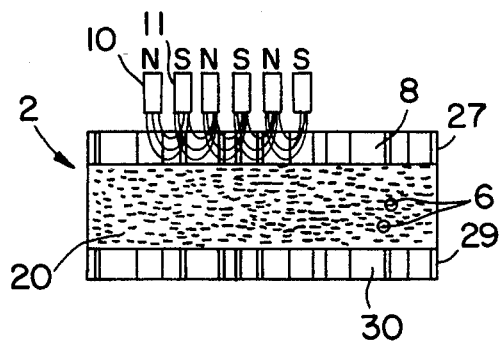
FIG. 5
FIG. 6

TEMPERATURE INDICATOR FOR DEEP-FROZEN PRODUCTS

This is a continuation of application Ser. No. 08/041,408, filed Mar. 31, 19993, now abandoned.

BACKGROUND OF THE INVENTION

1. Field of the Invention

The present invention relates to an apparatus for irreversibly indicating whether the maximum storage temperature of products stored in the frozen or deep-frozen state has been temporarily exceeded, consisting of a container which has a heat-conducting connection to the stored product and contains an inorganic eutectic mixture or an organic compound which has a melting point in the range from about 0° C. to −50° C., the container containing clearly indicating parts.

In the storage of foods in the frozen state, a storage temperature of at least −16° C. must be maintained if a relatively long shelf life is to be ensured. If, on the other hand, a temperature of −10° to −15° C. is exceeded, the shelf life of many foods is no longer ensured; the frozen material is considered to have thawed although it still appears frozen on the outside.

Usually, freezers are equipped with built-in thermometers which indicate the temperature in a certain part of the freezing space, or a conventional thermometer is placed on or next to the frozen material and is removed from the freezer for readings. In these cases, there is no guarantee that the temperature of the frozen material will be measured exactly. Moreover, air convection in the freezing space may be hindered by stacking and packing of the frozen material, so that the minimum temperatures required for ensuring the shelf life of the foods may be exceeded in certain parts of the freezing space, even when the equipment functions satisfactorily. The user of the frozen material cannot detect the fact that the maximum storage temperature has been exceeded, so that he cannot counteract spoilage of the food by removing it in good time and using it immediately. The danger that deep-frozen food will be thawed without this being noticed is particularly great, for example, when a relatively large amount of material to be chilled is introduced in a warm state into the freezer.

It is therefore desirable to have a temperature indicator which shows, for every food pack or for a group of packs, whether they have been sufficiently chilled during their entire storage time.

2. Description of the Related Art

Temperature-indicating apparatuses of the generic type stated at the outset are disclosed, for example, in DE 25 47 638 and 32 43 031. In the first-mentioned Laid-Open Application, the indicator element is a contact layer of absorptive material, over which a layer of a dye soluble in a liberated liquid is arranged, over which layer in turn an indicating layer of absorptive material is present. When the frozen material partially thaws, cellular liquid is released at its surface and is absorbed by the contact layer. The liquid thus absorbed dissolves part of the colour layer and the coloured liquid is then absorbed by the indicator layer whose discoloration provides evidence of reduction in quality due to interruption of the cooling chain.

The last-mentioned application describes a container having transparent walls, for example a flat bag, which contains a eutectic mixture, those walls of the container which face the frozen material bearing a recognizable inscription on their inner surface. When the temperature falls below the critical temperature, the inscription is invisible; it become visible only when the critical temperature is exceeded. This publication also states that an absorptive material can be placed between the frozen material and the container described, which absorptive material absorbs the liquid taken up on exceeding the critical temperature and in this way detects when the permissible temperature has been exceeded.

The two abovementioned temperature indicators have a complicated design; moreover, it is not ensured that the frozen product does not come into contact with the indicator medium and thus become damaged.

SUMMARY OF THE INVENTION

It is an object of the present invention to provide an indicator apparatus of the generic type stated at the outset, which does not have the above-mentioned disadvantages and irreversibly indicates if the permissible temperature is exceeded, the indication being presented optically in a simple manner or being detected by another means.

We have found that this object is achieved, according to the invention, by an apparatus for irreversibly indicating whether the permissible storage temperature of products stored in the frozen state has been temporarily exceeded, consisting of a container which has a heat-conducting connection to the stored product and contains, in its interior, a medium having a melting point in the range from about 0° to −50° C. and clearly indicating parts, wherein finely divided magnetically soft or magnetically hard pigments have been introduced into the medium and the container is exposed, during the liquid/solid or solid/liquid phase transition, to an external magnetic field which leaves behind optically or magnetically readable information in the medium. Further novel features are evident from the subclaims, the description and the drawing.

BRIEF DESCRIPTION OF THE DRAWINGS

The invention is described in detail below, reference being made to the drawings, in which:

FIG. 1 shows the invention applied to a foodstuff

FIG. 2 shows an enlarged view of the invention in cross section, with the magnetic stripe, magnetic pigments and support particles shown FIG. 3 shows an enlarged view of the invention in cross section, with the magnetic stripe, magnetic pigments and support nubs shown.

FIG. 4 shows an enlarged view of the invention in cross section, illustrating the optically readable messages the invention can deliver.

FIG. 5 shows an enlarged view of the invention in cross section, with the magnetic stripes, magnetic pigments and external magnetic field shown.

FIG. 6 shows the invention in plan view, with the magnetic pigment arranged into a pre-aligned pattern.

The indicator apparatus (2) which will be described in more detail is inserted into the covering (3), for example a shrink-film of the frozen material, at any point of the surface (4) of the frozen material (1). The temperature indicator (2) is preferably a flat bag (5) which consists of a flexible transparent plastic and contains, as a medium, an inorganic eutectic mixture or an organic compound, which have a melting point in the range from 0° to −50° C., preferably from −10° to −25° C.

DETAILED DESCRIPTION OF THE INVENTION

The essential feature of the invention is (see FIG. 2) that finely divided magnetically hard or magnetically soft pigments (6) are dispersed in the stated medium. Under the action of an external magnetic field, the magnetic pigments in the dispersion can be moved or collected at certain locations or concentrated. The external magnetic field used may be, for example, a magnetic stripe (7) or permanent magnet (not pictured) which contains, magnetically recorded, a bar code pattern (8) or alphanumeric characters (not pictured) or a graphics pattern, for example a company logo (not pictured), and which is in close contact with the magnetic dispersion in the bag, for example is stuck to the outside of the latter. The magnetic field of the magnetic stripe or permanent magnet causes the magnetic pigments to arrange themselves in conformity with the pattern of the magnetic stripe or permanent magnet.

If the carrier liquid of the magnetic dispersion and any additional auxiliary components, for example dispersants and stabilizers or the additives stated further below, are now chosen so that a liquid/solid phase transition occurs in the temperature range described, or at least the dispersion sets, the ordering of magnetic pigments is retained even after removal of the magnetic recording field, ie. of the magnetic stripe described above, and can, for example, be easily recognized visually with the naked eye as information or a defined pattern.

It is therefore merely necessary to maintain the external magnetic field during cooling of the material below the critical temperature and of the temperature indicator described and then to remove said magnetic field (8) after the temperature has fallen below the critical temperature. The ordered state of the solidified magnetic dispersion is maintained as long as the temperature does not exceed a certain value or does not exceed a certain value-time product.

However, if this is the case, for example on failure of the freezer, the viscosity of the magnetic dispersion is again reduced and the pattern vanishes owing to thermal excitation of the pigments. This provides the desired visual indication in the event that the critical temperature is exceeded.

However, it is also possible to scan the solidified magnetic state with a detector which responds to magnetic fields, for example magnetically recorded bar code information with a magnetically responding bar code reader. In this case, the bag containing the magnetic dispersion need not have transparent walls (5).

The magnetic temperature-sensitive dispersion described above can be produced simply and economically. Suitable dispersion liquids are substances which change their liquid/solid state of aggregation in the temperature range from 0° to −50° C. or at least exhibit a pronounced change in their viscosity. For example, eutectic mixtures, disclosed in the abovementioned DE 32 43 031, are suitable for this purpose, such as ammonium chloride, calcium nitrate, ammonium nitrate, sodium nitrate, potassium chloride or mixtures thereof together with water. Organic compounds, such as diethyl succinate, octyl caprylate, heptyl caprylate, hexyl laurate and others, are also suitable.

Finely divided magnetic pigments (6) obtained according to the prior art by precipitation or by a ceramic method are dispersed in this liquid. For example, $\gamma$-$Fe_2O_3$, $Fe_3O_4$, $CrO_2$, metal powders or alloys are suitable for this purpose. The magnetic behavior of the pigments described above (magnetically soft or magnetically hard) can be adjusted as desired by means of their structure and their composition. They should be chosen so that a sufficiently high magnetic force can be exerted on them for migration in the dispersion liquid, that their mutual attraction in the deep-frozen state is not too high so that separation during thawing as a result of thermal excitation is ensured, and that they are capable of producing good optical contrast for visual detection.

To achieve the abovementioned conditions, the magnetic pigments can be incorporated into low molecular weight or high molecular weight dispersants. Such dispersants are disclosed in, for example, DE 39 08 425. Furthermore, the magnetic pigments may be dispersed in polymeric binders; examples of these are likewise disclosed in the abovementioned DE 39 08 425.

To keep the distance between the two films of the bag which holds the dispersion composition small and constant, a correspondingly large colorless support pigment or latex (9) particles which act as spacers and prevent touching of the two film sides may be added to the dispersion. FIG. 2 shows the magnetic strip (8) applied to the front wall (7), and the particles (9) separating the front wall from the back wall (13). Another solution comprises (see FIG. 3) structuring the inside of one or both film surfaces (12), for example by means of nubs (14, shown attached to the back wall), so that the interior of the bag is divided into smaller regions to prevent merging of the dispersion (20). FIG. 3 shows the magnetic stripe (8) applied to the front wall (7), with nubs projecting from the back wall.

Suitable wall material for the film bag (5, 12) is, for example, polyester, polyethylene or polypropylene. After introduction of the abovementioned dispersion liquid, the bag is sealed, preferably by welding, to prevent the liquid from running out.

A magnetic foil, as found, for example, in credit and ATM cards, telephone cards, tickets or savings books and on which the abovementioned information has been recorded can be used for the magnetic inscription of the described temperature indicator. The magnetic foil is stuck to the bag and is placed, with a heat-conducting connection, on the material to be frozen, as shown in FIG. 1. After information transfer and cooling below the limiting temperature, the magnetic stripe (8) is simply removed and the novel temperature indicator is ready to use.

By suitable combination, the novel apparatus may contain even more advantageous embodiments. Thus, an outer or inner surface of the bag may contain a reflective or colored layer to enhance the contrast of the indication.

In a variant (see FIG. 4), it is furthermore possible to transform a visible pattern into another, likewise visible pattern on exceeding the critical temperature. For this purpose, in addition to the magnetic stripe (17) stuck to the upper surface, a second magnetic stripe (19) whose pattern is magnetically recorded only after freezing of the bag and which is applied to the bag only after freezing is mounted on the opposite side, ie. the lower side, of the bag. If, after removal of the stripe (17) stuck to the upper side, the critical temperature is exceeded, a pattern becomes visible in the dispersion as a result of the magnetic marking recorded on the second magnetic stripe and can be detected. In this way it is possible to read unambiguous yes/no information by a method in which, for example, the first magnetic stripe (17) visualizes the text deep-frozen and the second magnetic stripe visualizes (19) the text thawed in the medium. FIG. 4 illustrates this application, with the first, upper magnetic stripe (17) patterned to read "DEEP FROZEN" and the second, lower magnetic stripe patterned to read "THAWED".

However, it is also possible merely to use this second magnetic stripe (19) for detection in the manner described. In this case, a pattern only appears when the critical temperature is exceeded.

In a further variant (see FIG. 5), a magnetic stripe (29) having a magnetic pattern (30) as described above may be placed on the lower side of the bag, in addition or alternatively to the magnetic stripe (27) applied to the upper side, the pattern (8) of said magnetic stripe (27) being deleted by an external magnetic field (10, 11) when the freezing process is complete.

This permits many combinations or transitions from one visible or detectable pattern into another.

We claim:

1. A device for indicating whether the permissible storage temperature of products stored in the frozen state has been exceeded, comprising a container, with a transparent front surface and a back surface, which contains, in its interior, both a transparent carrier medium having a known melting point in the range from about 0° to −50° C., and finely divided magnetic pigments, said device further comprising a magnetic means having a patterned magnetic field which is applied to the back surface of the container after it is frozen, such that the magnetic pigments will assume the pattern of said magnetic field should the carrier medium ever thaw.

2. A device as defined in claim 1, wherein the magnetic pigments are pre-aligned in a second pattern, different from said pattern of said patterned magnetic field, while the carrier medium is in a fluid state and maintained in said second pattern throughout a subsequent freezing process, such that said second pattern is thereafter maintained as long as the carrier medium is kept frozen.

3. A device as defined in claim 1, wherein an outer of inner surface of the container possesses a reflective or colored layer which enhances the visual contrast of said magnetic pigments.

4. A device for indicating whether the permissible storage temperature of products stored in the frozen state has been exceeded, comprising a container with a transparent front surface which contains, in its interior, both a transparent carrier medium having a known melting point in the range from about 0° to −50° C. and finely divided magnetic pigments, wherein the container is a flat bag having a front and a back wall, and the support medium present therein contains support pigments or latex particles for stabilizing the distance between the two walls.

5. A device for indicating whether the permissible storage temperature of products stored in the frozen state has been exceeded, comprising a container with a transparent front surface which contains, in its interior, both a transparent carrier medium having a known melting point in the range from about 0° to −50° C., and finely divided magnetic pigments, wherein the container is a flat bag having a front and a back wall, and the walls of the bag have nubs or are otherwise structured so as to ensure a constant distance between the two walls.

6. A device for indicating whether the permissible storage temperature of products stored in the frozen state has been exceeded, comprising a container, formed as a flat bag, with a transparent front surface which contains, in its interior, both a transparent carrier medium having a known melting point in the range from about 0° to −50° C., and finely divided magnetic pigments, and wherein a magnetic stripe possessing a magnetic pattern is applied to a surface of the container so as to align the magnetic pigments in said pattern while the carrier medium is in the fluid state and throughout a subsequent freezing process, such that the pattern imparted is maintained as long as the carrier medium is kept frozen, and wherein an external magnetic field is applied to the magnetic stripe after the carrier medium is frozen, said external magnetic field deleting said magnetic pattern of said magnetic stripe.

\* \* \* \* \*